United States Patent
Jin et al.

(10) Patent No.: US 12,527,962 B2
(45) Date of Patent: Jan. 20, 2026

(54) PACING DEVICE FOR PREVENTING OCCURRENCE OF ATRIAL FIBRILLATION FOLLOWING PREMATURE ATRIAL CONTRACTION

(71) Applicant: CORERHYTHM MEDICAL TECHNOLOGY (HANGZHOU) CO., LTD., Zhejiang (CN)

(72) Inventors: Lian Jin, Hangzhou (CN); Min Huang, Hangzhou (CN); Guiling Li, Hangzhou (CN); Jianfei Wang, Hangzhou (CN); Zhen Zhou, Hangzhou (CN); Jianqu Xiong, Hangzhou (CN)

(73) Assignee: CORERHYTHM MEDICAL TECHNOLOGY (HANGZHOU) CO., LTD., Hangzhou (CN)

( * ) Notice: Subject to any disclaimer, the term of this patent is extended or adjusted under 35 U.S.C. 154(b) by 0 days.

(21) Appl. No.: 18/844,046

(22) PCT Filed: Apr. 4, 2023

(86) PCT No.: PCT/CN2023/086176
§ 371 (c)(1),
(2) Date: Sep. 4, 2024

(87) PCT Pub. No.: WO2023/226600
PCT Pub. Date: Nov. 30, 2023

(65) Prior Publication Data
US 2025/0108222 A1    Apr. 3, 2025

(30) Foreign Application Priority Data
May 26, 2022    (CN) .......................... 202210584918.X

(51) Int. Cl.
*A61N 1/365* (2006.01)
*A61N 1/02* (2006.01)
(Continued)

(52) U.S. Cl.
CPC ........... *A61N 1/3702* (2013.01); *A61N 1/025* (2013.01); *A61N 1/365* (2013.01); *G16H 40/63* (2018.01)

(58) Field of Classification Search
CPC .............................. A61N 1/395; A61N 1/3624
See application file for complete search history.

(56) References Cited

U.S. PATENT DOCUMENTS

| 5,978,709 A | 11/1999 | Begemann et al. |
| 6,957,104 B2 * | 10/2005 | Wagner ................ A61N 1/3956 607/9 |

(Continued)

FOREIGN PATENT DOCUMENTS

| CN | 108175941 A | 6/2018 |
| CN | 112004575 A | 11/2020 |
| CN | 114306937 A | 4/2022 |

*Primary Examiner* — George R Evanisko
(74) *Attorney, Agent, or Firm* — Jiwen Chen; Joywin IP Law PLLC

(57) ABSTRACT

Disclosed in the present invention is a pacing device for preventing occurrence of atrial fibrillation following premature atrial contraction, including: adjusting values of the number M of atrial events and the number N of premature atrial contraction events to control a pacing control process for preventing the occurrence of atrial fibrillation following premature atrial contraction to take place after a single or more than one premature atrial contraction events, and on the basis of a current p-p' interval, an atrial safe pacing interval and an average atrial interval, setting a smooth transition pacing sequence. The smooth transition pacing sequence avoids atrial compensation intervals caused by the premature atrial contraction and avoids occurrence of a "short-long-short" sequence. Meanwhile, the number of pacing intervals in the smooth transition pacing sequence is controllably set, and the pacing intervals included sequentially increase and are gradually in transition to the average (Continued)

atrial interval representing a normal atrial interval prior to the occurrence of the premature atrial contraction events, so that the occurrence of the alternation of action potential durations is avoided, and the occurrence of atrial fibrillation caused by the premature atrial contraction is prevented at multiple levels.

3 Claims, 3 Drawing Sheets

(51) Int. Cl.
*A61N 1/37* (2006.01)
*G16H 40/63* (2018.01)

(56) References Cited

U.S. PATENT DOCUMENTS

2003/0125775 A1  7/2003  Wagner
2003/0163169 A1  8/2003  Hill et al.

* cited by examiner

PACING DEVICE FOR PREVENTING OCCURRENCE OF ATRIAL FIBRILLATION FOLLOWING PREMATURE ATRIAL CONTRACTION

This is a U.S. national stage application of PCT Application No. PCT/CN2023/086176 under 35 U.S.C. 371, filed Apr. 4, 2023 in Chinese, claiming priority of Chinese Application No. 202210584918.X, May 26, 2022, all of which are hereby incorporated by reference.

FIELD OF TECHNOLOGY

The present invention belongs to the technical field of medical apparatuses, in particular to a pacing device for preventing occurrence of atrial fibrillation following premature atrial contraction.

BACKGROUND TECHNOLOGY

Atrial Fibrillation (AF) is the most common type of tachyarrhythmia in clinical practice. Implantable medical devices can monitor intracavity electrical information in atria and ventricles, respectively. By looking at intracavitary electrocardiograms taken with the implantable medical devices, researchers find that 72% of atrial fibrillations are preceded by changes in heart rhythm; and about 48% of patients have firstly experienced paroxysmal Premature Atrial Contractions (PACs). The premature atrial contractions, also known as atrial premature complexes (APC) or atrial premature beats (APB), refer to contractions of the atria that are triggered by the atrial myocardium but have not originated from the sinoatrial node and area common cardiac dysrhythmia. The influence of premature atrial contraction on occurrence of the atrial fibrillation is multifaceted:

On the one hand, the action potential duration (APD) duration of cardiomyocytes and the excitatory conduction rate among the cardiomyocytes would change with a change of Diastolic Interval (DI) between the end of an action potential and the start of a next action potential. This relationship between the electrophysiological properties of cardiomyocytes and the diastolic interval can be represented by an electrical recovery characteristic curve. The electrical recovery characteristic curves of atrial cells in different parts and different initial states are different, but they all showed a tendency to be steep first and gentle later. The steep region of the electrical recovery characteristic curve starts from a diastolic interval of 0, and its length is generally 50 milliseconds to 100 milliseconds. A small change in the diastolic interval in this region would lead to significant changes in the action potential durationduration and the conduction rate. Clinical studies have shown that the slopes of the steepest parts of recovery characteristic curves of action potential durations in some patients with paroxysmal atrial fibrillations can reach 1.5-2. A short diastolic interval caused by a premature atrial contraction may result in most atrial cells being in the steep region of electrical recovery characteristics curve during atrial excitation, thus leading to dispersion of electrophysiological states of atrial cells and promoting the occurrence of atrial fibrillation. The steep region of the atrial cell electrical recovery characteristic curve overlaps with a "vulnerable period" of an atrium in the clinical practice. However, because an expression and definition of the atrial vulnerable period are far less clear than that of a ventricle vulnerable period, the concept of using the steep region of the electrical recovery characteristic curve is clearer. FIG. 1 shows a typical fitting curve of recovery characteristics of an atrial cell action potential duration, along with a steep region of electrical recovery characteristics.

On the other hand, the occurrence of premature atrial contraction may cause a normal sinus heart rate or pacing stimulation that should cause the atrial excitation to fall into the effective refractory period of the atrial cells, forming a compensatory interval that is longer than the normal atrial contraction interval. A "short-long-short" sequence formed by the compensatory interval and atrial excitatory intervals before and after the compensatory interval is also a typical excitatory pattern that is easy to trigger the occurrence of atrial fibrillation in the clinical practice.

In an implantable medical device, after a premature atrial contraction is sensed, if the delivery of the scheduled pacing pulse is not changed or canceled, it may cause a stimulation to fall into a steep region of electrical recovery characteristics curve or form a "short-long-short" sequence, which is not conducive to the prevention of atrial fibrillation. Due to a high correlation between premature atrial contraction and the occurrence of atrial fibrillation, some implantable medical devices currently provide a function of preventing the occurrence of atrial fibrillation by actively changing a pacing interval during a period following the premature atrial contraction is sensed. At present, this function can be realized in two main ways:

One is based on an atrial interval of the premature atrial contraction (p-p' interval), which is gradually lengthened in proportion as a subsequent pacing interval, until an autonomous heart rate is sensed or a preset normal pacing frequency is reached. With this method, if the p-p' interval is short, the diastolic interval of the pacing interval lengthened in proportion may still be in the steep region of the electrical recovery characteristic curve, which is not conducive to the prevention of atrial fibrillation. In addition, in this solution, the number of special pacing following the premature atrial contraction is not controllable.

The second is to perform overdrive pacing for a period at a frequency higher than a preset pacing frequency or a sinus heart rate after the premature atrial contraction is sensed. With this method, there is no gradual transition of pacing intervals after the premature atrial contraction, and direct fixed frequency overdrive pacing with a high frequency may lead to alternation of the action potential durations of atrial cells in the clinical practice, providing electrophysiological conditions for the occurrence of atrial fibrillation.

In addition, the occurrence of premature atrial contraction is quite common in the clinical practice and also occurs during activities of a healthy heart, and not all premature atrial contractions trigger the atrial fibrillation. In some patients with the paroxysmal atrial fibrillations, the atrial fibrillations are observed to occur more frequently after dense premature atrial contractions in a short period, while a single premature atrial contraction is less likely to cause the atrial fibrillation. Current pacing schemes for preventing the atrial fibrillation after the premature atrial contraction usually enter the corresponding process after sensing a premature atrial contraction. For some patients with low atrial fibrillation loads but frequent premature atrial contractions, a large number of unnecessary high-frequency pacing would be introduced to accelerate power consumption of pacing devices and burden of patients.

In summary, there are some defects in the pacing schemes commonly used to prevent the occurrence of atrial fibrillation after premature atrial contractions, which cannot accurately and effectively prevent the occurrence of atrial fibrillation.

SUMMARY OF THE INVENTION

In view of the above, the object of the present invention is to provide a pacing device for preventing occurrence of atrial fibrillation following premature atrial contractions. By effectively utilizing the atrial interval with premature atrial contraction and the average atrial interval before the occurrence of premature atrial contraction, and setting the pacing interval of a certain number of beats after the premature atrial contraction, the occurrence of atrial fibrillation after the premature atrial contraction is prevented.

For the object of the present invention, provided in an example is a pacing device for preventing occurrence of atrial fibrillation following premature atrial contraction, comprising an atrial sensing module, an atrial pacing module, a clock/timing module, a pacing control module, a data statistics module, and a storage module. The atrial sensing module being configured to sense atrial signals, the atrial pacing module being configured to deliver atrial pacing pulses, the clock/timing module is configured to perform firing timing on atrial pacing events and acquire atrial intervals;

the storage module is configured to store atrial events, atrial intervals identified by the pacing control module, wherein the atrial events comprise atrial pacing events, atrial sensing events, and premature atrial contraction events; the storage module is also configured to store the average atrial interval and atrial safe pacing interval;

the data statistics module is configured to calculate the average atrial interval according to the atrial intervals;

the pacing control module is configured to extract M recent consecutive atrial events containing a current premature atrial contraction event from the storage module when a current atrial event is identified as a premature atrial contraction event, and control the pacing device to enter into a pacing control process to prevent the occurrence of atrial fibrillation following the premature atrial contraction when N premature atrial contraction events are present in the M atrial events, wherein the value range of N is [1, M]; and the pacing control process comprises: acquiring the current atrial interval, the atrial safe pacing interval and the latest average atrial interval corresponding to the current premature atrial contraction event from the storage module; comparing the current atrial interval with the atrial safe pacing interval; when the atrial interval is less than the atrial safe pacing interval, taking the atrial safe pacing interval as an initial smooth pacing interval, taking the latest average atrial interval as a target smooth pacing interval, and constructing a first smooth transition pacing sequence; when the atrial interval is greater than or equal to the atrial safe pacing interval, taking the current atrial interval as the initial smooth pacing interval, taking the latest average atrial interval as the target smooth pacing interval, and constructing a second smooth transition pacing sequence; and then controlling the atrial pacing module to transmit the atrial pacing pulses according to the first smooth transition pacing sequence or the second smooth transition pacing sequence to achieve smooth transition pacing.

In an example, a determination method of the atrial safe pacing interval comprises:

taking a sum of a steady-state atrial cell action potential duration and an atrial safe diastolic interval as the atrial safe pacing interval, and preferably, the steady-state atrial cell action potential duration being 200 ms to 300 ms, and the atrial safe diastolic interval being 50 ms to 150 ms.

In an example, a determination method of the average atrial interval comprises:

extracting, from the storage module, a plurality of recent consecutive atrial intervals containing the current atrial interval, wherein the atrial intervals do not contain the atrial interval of the premature atrial contraction event; and taking an average value of the plurality of atrial intervals as a latest average atrial interval.

In an example, the number M of the atrial events is set according to a hardware storage capability of the pacing device and is set to 4-12;

the number N of the premature atrial contraction events is set by a physician according to a frequency and mode of the occurrence of atrial fibrillation on a subject; when an average frequency of paroxysmal atrial fibrillation is greater than or equal to once per week, N is set to 1; and when the average frequency of paroxysmal atrial fibrillation is less than once per week, N is set to be greater than 1 and less than M;

and/or, a value of the number N of the premature atrial contraction events is automatically adjusted according to records of statistically recorded atrial fibrillation events and atrial events prior to the occurrence of atrial fibrillation, comprising: under a condition that the premature atrial contraction events are present in a specific number of atrial events prior to the occurrence of atrial fibrillation and the number is less than a set threshold, the value of N is automatically decreased; and under a condition that the premature atrial contraction events are present in a specific number of atrial events prior to the occurrence of atrial fibrillation and the number is greater than or equal to the set threshold, the value of N is automatically increased, wherein the specific number of atrial events is 4-16, and the set threshold is 2-8.

In an example, the times of target smooth transition pacing in a smooth transition pacing process is set to K, and each smooth transition pacing interval is determined according to the following formula so as to construct the first smooth transition pacing sequence and the second smooth transition pacing sequence:

$$\text{ASPI\_}[k+1] = (\text{ASPI\_}[k] + \text{ASPI\_Target})/2$$

wherein ASPI_Target represents the target smooth pacing interval of which a value is taken as the latest average atrial interval; when k=1, 2, 3, . . . , or K−2, ASPI_k represents a $K^{th}$ smooth transition pacing interval obtained by calculation; when k=0, ASPI_[0] represents the initial smooth pacing interval; when the atrial interval is less than the atrial safe pacing interval, a value of ASPI_[0] is taken as the atrial safe pacing interval, and the atrial safe pacing interval and K−1 smooth transition pacing intervals form the first smooth transition pacing sequence with a dimension of K; and when the atrial interval is greater than or equal to the atrial safe pacing interval, a value of ASPI_[0] is taken as the current atrial interval, and the current atrial interval and the K−1 smooth transition pacing intervals form the second smooth transition pacing sequence with a dimension of K.

In an example, the number K of target smooth transition pacing in the smooth transition pacing process is set by the physician in combination with a physiological state of the subject, and under a condition that the subject is required to be restored from the smooth transition pacing to a normal pacing state as soon as possible, K is set to 2-4; and under a condition that longer and more gentle smooth transition pacing time is required, K is set to 5-16.

In an example, after the pacing control module controls the atrial pacing module to deliver the atrial pacing pulses according to the smooth transition pacing sequence, the pacing control module restores a preset pacing interval, and controls the atrial pacing module to transmit the atrial pacing pulses according to the preset pacing interval.

In an example, after the pacing control module controls the atrial pacing module to deliver the atrial pacing pulses according to the smooth transition pacing sequence, the pacing control module compares the preset pacing interval with the target smooth pacing interval, and when a difference therebetween is greater than a preset threshold, the pacing control module controls the atrial pacing module to deliver the atrial pacing pulses once in the target smooth pacing interval, and then restores the preset pacing interval, and controls the atrial pacing module to transmit the atrial pacing pulses according to the preset pacing interval.

In an embodiment, in a smooth transition pacing phase, under a condition that an atrial event beyond a refractory period is sensed, an intrinsic sinus rate at this time has exceeded a smooth transition pacing frequency, and the smooth transition pacing is ended.

Compared with the prior art, the pacing device for preventing occurrence of atrial fibrillation following premature atrial contraction provided by the present invention has at least the following beneficial effects:

According to the physiological state of the subject, such as the frequency and conditions of the occurrence of atrial fibrillation on the subject obtained from clinical records, the pacing control process to prevent the occurrence of atrial fibrillation following the premature atrial contraction can be controlled by adjusting the values of the number M of atrial events and the number N of premature atrial contraction events, so that the pacing control process can be carried out after a single or a plurality of premature atrial contraction events greater than 1. Therefore, a radical degree of the function of the pacing control process is consistent with the actual state of the subject, and unnecessary high frequency pacing is reduced to achieve more targeted pacing for atrial fibrillation prevention.

The atrial safe pacing interval is set by combining the electrophysiological characteristics of heart cells and the heart rate distribution of the subject. By setting the atrial safe pacing interval, the atrial cells escape from the steep region of electrical recovery characteristics and the vulnerable period of the atrium when receiving the pacing stimulation, so as to reduce the electrophysiological dispersion in the atrium.

On the basis of the current p-p' interval, the atrial safe pacing interval and the average atrial interval, setting the smooth transition pacing sequence. The smooth transition pacing sequence avoids atrial compensation intervals caused by the premature atrial contraction and avoids occurrence of a "short-long-short" sequence. Meanwhile, the calculation method of smooth transition pacing sequence determines that the pacing frequency can be controlled, and at the same time, the pacing intervals contained in the smooth transition pacing sequence increase in turn and are gradually in transition to the average atrial interval representing a normal atrial interval prior to the occurrence of the premature atrial contraction events, so that the occurrence of the alternations of action potential durations is avoided, and the occurrence of atrial fibrillation caused by the premature atrial contraction is prevented at multiple levels.

BRIEF DESCRIPTION OF THE DRAWINGS

In order to more clearly illustrate the technical scheme in the examples of the present invention or in the prior art, the following is a brief introduction of drawings required to be used in the description of the examples or the prior art. Obviously, the drawings described below are only some examples of the present invention, and for a skilled person in the art, without creative labor, other drawings are also available based on these drawings.

DETAILED DESCRIPTION OF THE EMBODIMENTS

In order to make the purpose, technical solution and advantages of the present invention more clearly understood, the present invention is further described in detail in combination with the attached drawings and examples. It should be understood that the specific embodiments described herein are intended only to explain the present invention and do not limit the protection scope of the present invention.

In view of the following technical problems existing in application of an implantable medical device, an example provides a pacing device for preventing occurrence of atrial fibrillation following premature atrial contraction:

a first technical problem: after a premature atrial contraction event occurs in an atrium, a traditional pacing mode may fall into a steep region of electrical recovery characteristics or form a "short-long-short" sequence, which aggravates a risk of atrial fibrillation;

a second technical problem: a current scheme for preventing atrial fibrillation after a premature atrial contraction event is fixed to be performed after each premature atrial contraction event, which may cause a problem of a large number of ineffective high frequency pacing in a patient with frequent premature atrial contractions but a low atrial fibrillation load;

a third technical problem: a scheme for preventing atrial fibrillation by proportionally lengthening an atrial pacing interval after premature atrial contraction is unable to timely enable atrial cells to escape from a steep region of electrical recovery characteristics for premature contraction occurred earlier; and A fourth technical problem: a scheme for preventing atrial fibrillation by overdrive pacing with a fixed frequency after premature atrial contraction may lead to alternations of atrial cell action potential durations and poor preventive effect of atrial fibrillation.

Figure 1:
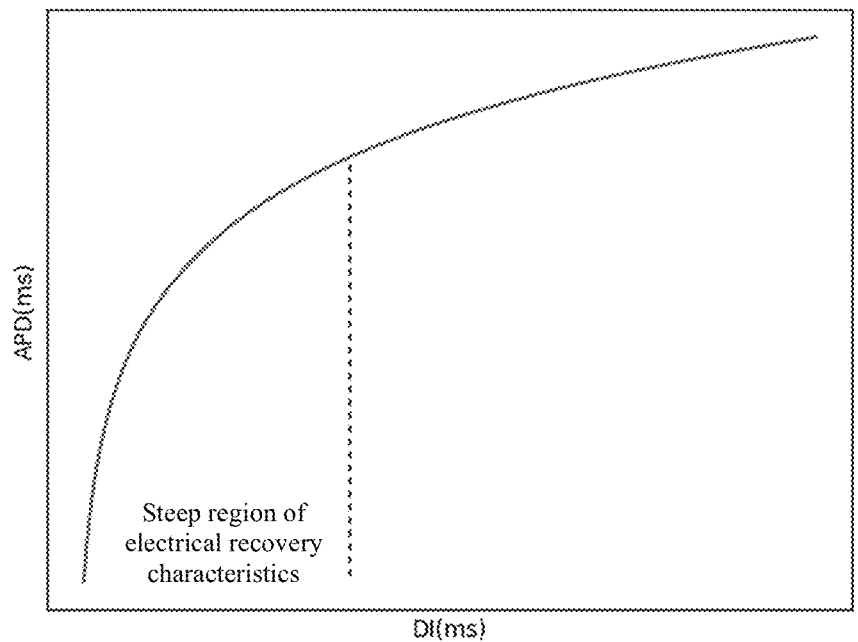
FIG. 1 illustrates a fitting curve of recovery characteristics of a left atrial cell action potential duration, along with a steep region of electrical recovery characteristics.
Figure 2:
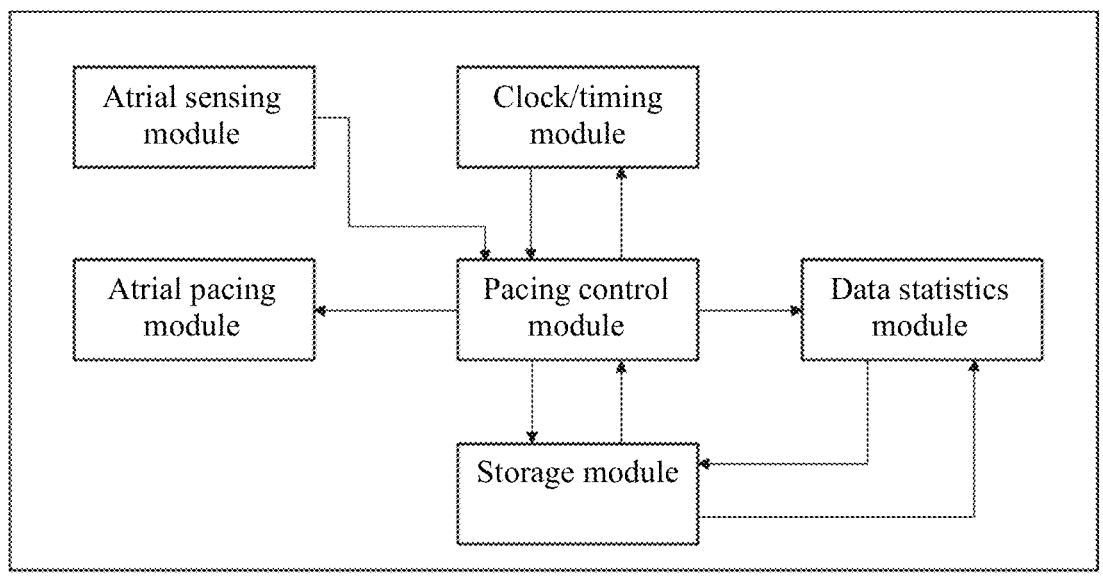
FIG. 2 is a schematic diagram of a module structure of the pacing device for preventing occurrence of atrial fibrillation following premature atrial contraction provided in an example.

FIG. 2 is a schematic diagram of a module structure of the pacing device for preventing occurrence of atrial fibrillation following premature atrial contraction provided in an example. As shown in FIG. 2, the pacing device provided by the example comprises an atrial sensing module, a clock/timing module, an atrial pacing module, a pacing control module, a data statistics module, and a storage module. The atrial sensing module is configured to sense atrial signals, the atrial pacing module is configured to deliver atrial pacing pulses, the clock/timing module is configured to perform firing timing on atrial pacing pulses and acquire atrial intervals; the pacing control module is configured to perform a logical judgment and numerical calculation related to pacing in the device, and determine pacing intervals and transmit them to the clock/timing module; the data statistics module is configured to calculate an average atrial interval according to the atrial intervals; and the storage module is configured to store various parameters and variables, including atrial events, the atrial intervals, the average atrial interval, atrial safe pacing intervals, and target smooth transition pacing times, wherein the atrial events include atrial pacing events, atrial sensing events, and premature atrial contraction events.

In an example, the atrial sensing module senses and transmits atrial activity signals to the pacing control module; the pacing control module sets a pacing interval and an atrial refractory period shorter than a normal sinus atrial interval or pacing interval based on a preset lower pacing interval (LRI), initiates the pacing interval and atrial refractory period both during atrial sensing and after atrial pacing, and transmits them to the clock/timing module. The clock timing module performs timing according to the pacing interval. When the timing for the pacing interval is complete and there is no atrial sensing event during the pacing interval, the pacing control module controls the atrial pacing module to deliver atrial pacing pulses, resets the pacing interval and atrial refractory period, transmits them to the clock/timing module, and identifies, at the same time, the atrial pacing pulses as Atrial Pacing (AP) events and records them in the storage module. If an atrial event outside the atrial refractory period is sensed during the pacing interval, the timing for the pacing interval is terminated, the pacing interval and the atrial refractory period are reset, and the atrial event outside the atrial refractory period during the pacing interval is identified, at the same time, as an atrial sensed (AS) event and recorded in the storage module. If an atrial event during the atrial refractory period is sensed during the pacing interval, the timing for the pacing interval is terminated, and the atrial event sensed during the atrial refractory period is identified, at the same time, as the premature atrial contraction (AR) event.

After the atrial sensing event and the atrial pacing event, the pacing control module obtains an event interval between a current atrial event and a previous atrial event according to the timing data of the clock timing module, that is, a current atrial interval. The pacing control module transmits the current atrial interval to the storage module and the data statistics module. The data statistics module calculates an average value based on the current atrial interval and a plurality of recent atrial intervals extracted from the storage module to obtain the latest average atrial interval and transmit the latest average atrial interval to the storage module for storage. For example, the average atrial interval can be taken as an average value of four recent atrial intervals. It should be noted that the atrial events used to calculate the average atrial interval must be atrial pacing events or atrial sensing events, and the atrial interval including the premature atrial contraction event does not participate in the calculation of the average atrial interval, so the latest average atrial interval can reflect a normal atrial interval before the occurrence of premature atrial contraction.

In an example, the storage module also stores the atrial safe pacing intervals for the pacing control module to call when needed. A determination method of the atrial safe pacing interval comprises: the sum of a steady-state atrial cell action potential duration and the atrial safe diastolic interval is taken as the atrial safe pacing interval. Since some diseases may lead to electrical remodeling of an atrium of a subject, the steady-state atrial cell action potential duration and the atrial safe diastolic interval can be flexibly adjusted and set according to actual physiological conditions of the subject. The steady-state atrial cell action potential durations should consider the action potential durations of cells in different parts of the atrium. The value of safe diastolic interval is the value of diastolic interval that allows most atrial cells to escape from the steep region of electrical recovery characteristics, and conduction time of action potential in the atrium should also be considered. Preferably, the steady-state atrial cell action potential duration being 200 ms to 300 ms, and the atrial safe diastolic interval being 50 ms to 150 ms. In a specific setting, a certain margin is retained so that when pacing with the atrial safe pacing interval is achieved, the atrial cells in different parts escape from the steep region of electrical recovery characteristics when receiving a stimulation.

In an example, the pacing control module extracts M recent consecutive atrial events containing a current premature atrial contraction event from the storage module when a current atrial event is identified as a premature atrial contraction event, and control to enter into a pacing control process to prevent the occurrence of atrial fibrillation following the premature atrial contraction when N premature atrial contraction events are present in the M atrial events, wherein the value range of N is [1, M].

In one embodiment, after an atrial event occurs, the pacing control module obtains the time sequence and type of the latest M atrial events from the storage module, deletes the earliest atrial event, and adds the latest current atrial event information to update the M atrial events. After that, the pacing control module transmits the updated time sequence and type of M atrial events to the storage module for storage, so as to realize the update and acquisition of M atrial events including the current atrial event.

In an example, the number M of the atrial events is set according to a hardware storage capability of the pacing device and an experience value thereof is set to 4-12. The number N of the premature atrial contraction events is set by a physician according to a frequency and mode of the occurrence of atrial fibrillation on a subject. If the subject has a high frequency of atrial fibrillation (preferably, an average frequency of paroxysmal atrial fibrillation is greater than or equal to once per week) and atrial fibrillation after a single premature atrial contraction is observed from a clinical electrocardiogram, N is set to 1. If the subject has a low frequency of atrial fibrillation (preferably, the average frequency of paroxysmal atrial fibrillation is less than once per week) or dense atrial fibrillations after the premature atrial contraction are only observed from a clinical electrocardiogram, N is set to be greater than 1 and less than M.

In an example, a value of the number N of the premature atrial contraction events may also be automatically adjusted according to records of statistically recorded atrial fibrillation events and atrial events prior to the occurrence of atrial fibrillation, comprising: under a condition that the premature atrial contraction events are present in a specific number of atrial events prior to the occurrence of atrial fibrillation and the number is less than a set threshold, the value of N is automatically decreased; and under a condition that the premature atrial contraction events are present in a specific number of atrial events prior to the occurrence of atrial fibrillation and the number is greater than the set threshold, the value of N is automatically increased. The specific number of atrial events is 4-16, and the set threshold is 2-8.

When N is 1, the implementation of atrial fibrillation prevention is the most radical, and the implementation of the atrial fibrillation prevention scheme is the most radical. The pacing control process for preventing the occurrence of atrial fibrillation would be carried out after each premature atrial contraction event, that is, after the current premature atrial contraction event, it is controlled to enter the pacing control process to prevent the occurrence of atrial fibrillation following premature atrial contraction. When N is greater than 1, the pacing control process for preventing the atrial fibrillation would only occur after the dense premature atrial contractions in a short period of time, that is, when N premature atrial contraction events accumulate in M atrial events, it is controlled to enter the pacing control process for preventing the occurrence of atrial fibrillation following the premature atrial contraction after the most recent premature atrial contraction event. Such a scheme is understood as performing the pacing control process for preventing the occurrence of atrial fibrillation once when N premature atrial contraction events occur in a cluster.

In an example, the pacing control process comprises: firstly, acquiring a current atrial interval (p-p' interval), an atrial safe pacing interval and a latest average atrial interval corresponding to the current premature atrial contraction event from the storage module, wherein the current atrial interval corresponding to the current premature atrial contraction event is determined based on the current premature atrial contraction event and a previous atrial event (the atrial event is the atrial pacing event, the atrial sensing event, or the premature atrial contraction event); and then comparing the current atrial interval with the atrial safe pacing interval; when the atrial interval is less than the atrial safe pacing interval, taking the atrial safe pacing interval as an initial smooth pacing interval, taking the latest average atrial interval as a target smooth pacing interval, and constructing a first smooth transition pacing sequence; when the atrial interval is greater than or equal to the atrial safe pacing interval, taking the current atrial interval as the initial smooth pacing interval, taking the latest average atrial interval as the target smooth pacing interval, and constructing a second smooth transition pacing sequence; and then controlling the atrial pacing module to transmit the atrial pacing pulses according to the first smooth transition pacing sequence or the second smooth transition pacing sequence to perform smooth transition pacing.

In an example, the times of target smooth transition pacing in a smooth transition pacing process is set to K, and each smooth transition pacing interval is determined according to the following formula so as to construct the first smooth transition pacing sequence and the second smooth transition pacing sequence:

$$\text{ASPI\_}[k+1] = (\text{ASPI\_}[k] + \text{ASPI\_Target})/2$$

wherein, ASPI_Target represents the target smooth pacing interval of which a value is taken as the latest average atrial interval; when k=1, 2, 3, . . . , or K−2, ASPI_k represents a $K^{th}$ smooth transition pacing interval obtained by calculation; when k=0, ASPI [0] represents the initial smooth pacing interval; when the atrial interval is less than the atrial safe pacing interval, a value of ASPI_[0] is taken as the atrial safe pacing interval, and the atrial safe pacing interval and K−1 smooth transition pacing intervals form the first smooth transition pacing sequence with a dimension of K; and when the atrial interval is greater than or equal to the atrial safe pacing interval, a value of ASPI_[0] is taken as the current atrial interval, and the current atrial interval and the K−1 smooth transition pacing intervals form the second smooth transition pacing sequence with a dimension of K.

When the smooth transition pacing is performed using the first smooth transition pacing sequence, atrial pacing is performed once in the atrial safe pacing interval, which can make the atrial cells escape from the steep region of electrical recovery characteristics and the vulnerable period of the atrium when receiving the pacing stimulation, and reduce the electrophysiological dispersion in the atrium.

In an example, the number K of target smooth transition pacing in the smooth transition pacing process is manually set by the physician according to the physiological state of the subject. If the subject needs to recover from the smooth transition pacing to the normal pacing state as soon as possible, K is set to a small value, and a preferred experience value is 2-4, which can make the smooth transition pacing end as soon as possible and restore the normal pacing mode. If the smooth transition pacing is required for a longer and more gradual period, K is set to a larger value, and a preferred experience value is 5-16.

Figure 3:
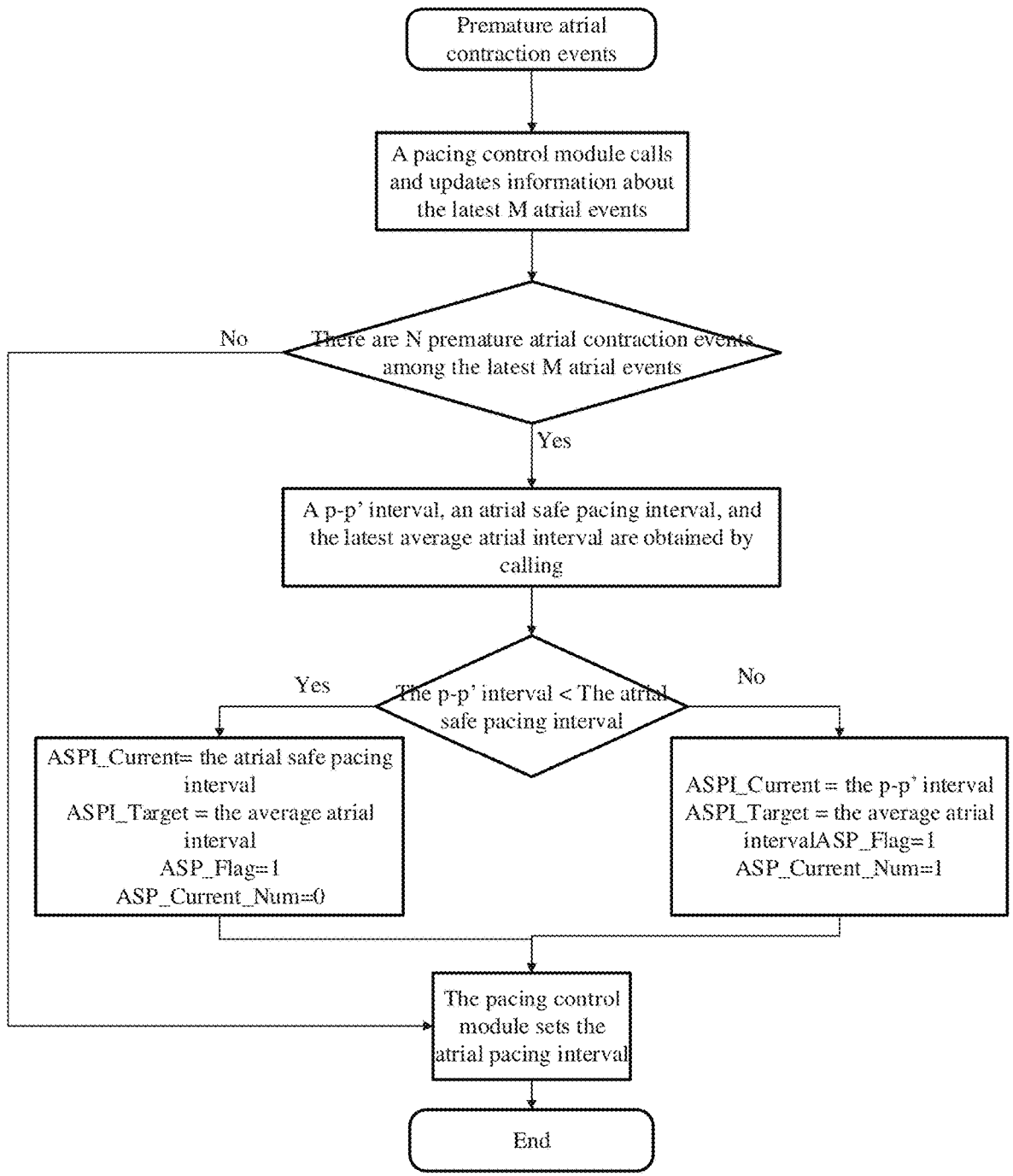
FIG. 3 is a processing flow after a sensed premature atrial contraction event provided in an example.

FIG. 3 is a processing flow after a sensed premature atrial contraction event provided in an example. As shown in FIG. 3, after sensing a premature atrial contraction event, the pacing control module first calls and updates the information of the latest M atrial events from the storage module, including the time sequence and type of atrial events, and transmits the updated information back to the storage module. At the same time, the pacing control module determines whether N premature atrial contraction events existed among the recent M atrial events. If not, the pacing control module resets the atrial pacing interval, otherwise entering the pacing control process for atrial fibrillation prevention: after obtaining the current p-p' interval, the atrial safe pacing interval and the latest average atrial interval, the pacing control module compares the current p-p' interval with the atrial safe pacing interval to determine whether it is necessary to perform pacing once with the atrial safe pacing interval so that the atrial cells can escape from the steep region of electrical recovery characteristics in time. When the current p-p' interval is less than the atrial safe pacing interval, the current smooth transition pacing interval ASP-I_Current is set as the atrial safe pacing interval, the target smooth transition pacing interval ASPI_Target is set as the latest average atrial interval, and a smooth transition pacing flag ASP_Flag is set to 1, indicating that a smooth transition pacing stage is entered into, and the current number ASP_Current_Num of smooth transition pacing is set to 0, indicating that the current number of smooth transition pacing is zero. Then, the smooth transition pacing is performed according to the first smooth transition pacing sequence constructed.

When the current p-p' interval is greater than or equal to the atrial safe pacing interval, the current smooth transition pacing interval ASPI_Current is set as the current p-p' interval, the target smooth transition pacing interval ASPI_Target is set as the latest average atrial interval, and a smooth transition pacing flag ASP_Flag is set to 1, indicating that a smooth transition pacing stage is entered into, and the current number ASP_Current_Num of smooth transition pacing is set to 1, indicating that the current number of smooth transition pacing is 1. Then, the smooth transition pacing is performed according to the second smooth transition pacing sequence constructed. After the smooth transition pacing ends, the pacing control module resets the atrial pacing interval.

Figure 4:
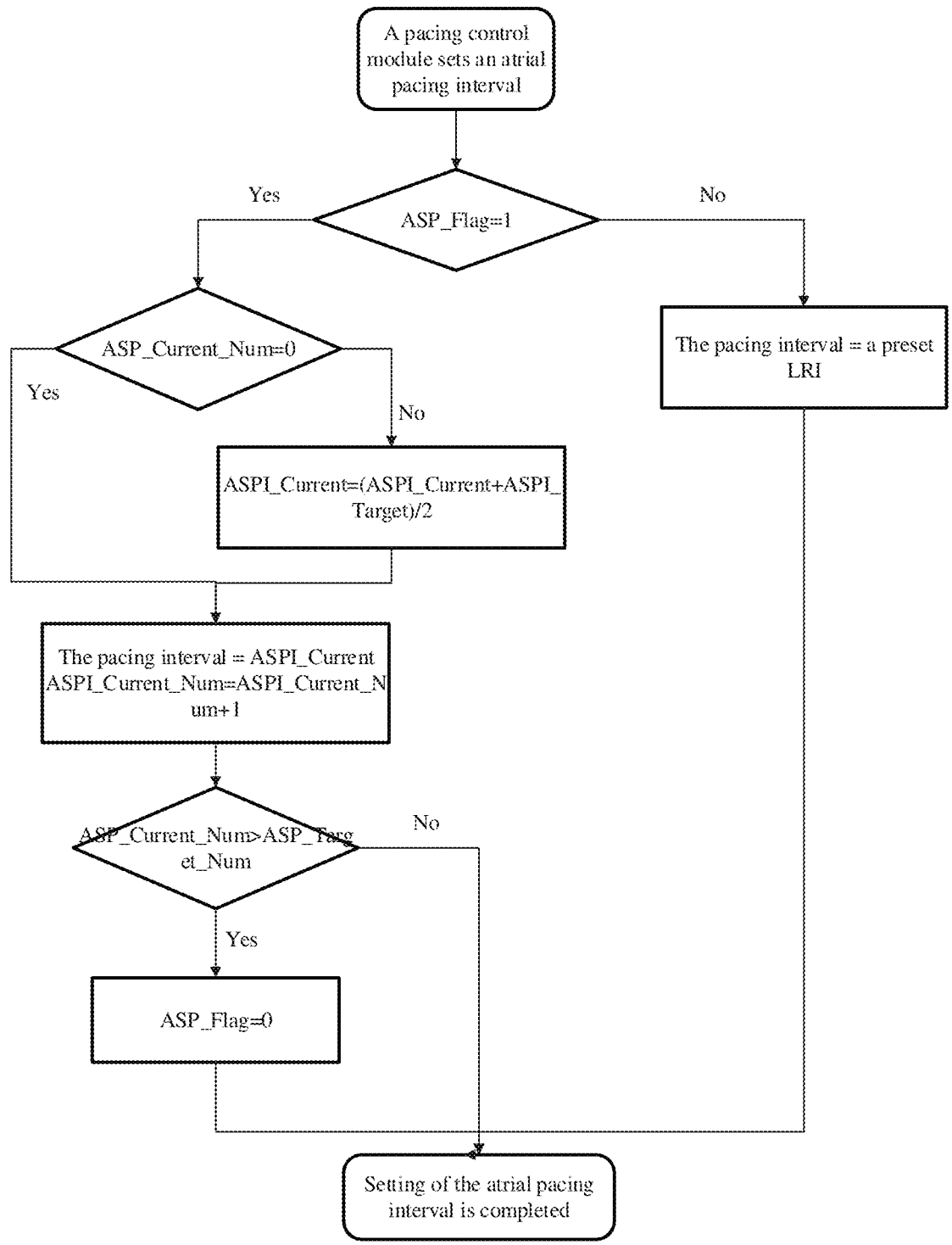
FIG. 4 is a flow of a pacing interval setting for a smooth transition pacing sequence provided in an example.

FIG. 4 is a flow of a pacing interval setting for a smooth transition pacing sequence provided in an example. As shown in FIG. 4, the pacing control module first checks the smooth transition pacing flag ASP_Flag when setting the pacing interval. If ASP_Flag=0, the preset LRI is called to set the pacing interval. If ASP_Flag=1, it indicates a smooth transition pacing stage. When the current number of smooth transition pacing ASP_Current_Num=0, it indicates that the p-p' interval is less than the atrial safe pacing interval, the atrial safe pacing interval is taken as the current smooth transition pacing interval ASPI_Current, and an atrial pacing is performed once according to the current smooth transition pacing interval. That is, the pulse pacing module is controlled to perform the atrial pacing once at the pacing interval=ASPI_Current, so that the atrial cells timely escape from the steep region of electrical recovery characteristics. If ASP_Current_Num>0, the current smooth transition pacing interval ASPI_Current and the target smooth pacing interval ASPI_Target are averaged, and an averaged result is set to a new ASPI_Current and update of the ASPI_Current=(ASPI_Current+ASPI_Target)/2 is performed and the pulse pacing module is controlled to perform the atrial pacing once with the pacing interval=ASPI_Current. After completing the atrial pacing once, the number of current smooth transition pacing ASP_Current_Num is added by 1. i.e., ASP_Current_Num=ASP_Current_Num+1, and it is compared with the preset number of target smooth transition pacing ASP_Target_Num called from the storage module. If the ASP_Target_Num has been reached, the ASP_Flag is set to 0 to terminate the smooth transition pacing. If the ASP_Target_Num has not been reached, setting of performing the pacing interval once is completed. The next time the pacing interval is set, the procedure for ASP_Current_Num>0 continues when ASP_Flag=1. By setting the smooth transition pacing sequence in this method, the pacing frequency of smooth transition can be controlled, and the pacing interval can be gradually increased, gradually approaching the average atrial interval reflecting the normal atrial interval before the occurrence of premature atrial contraction.

In an example, in a smooth transition pacing phase, under a condition that an atrial event beyond a refractory period is sensed, an intrinsic sinus rate at this time has exceeded a smooth transition pacing frequency, the ASP_Flag should be set to 0 at this time and the smooth transition pacing is ended.

In an example, after the pacing control module controls the atrial pacing module to deliver the atrial pacing events according to the smooth transition pacing sequence, the pacing control module restores an original preset pacing interval, and controls the atrial pacing module to transmit the atrial pacing pulses according to the preset pacing interval.

In an example, after the pacing control module controls the atrial pacing module to deliver the atrial pacing pulses according to the smooth transition pacing sequence, the pacing control module compares the original preset pacing interval with the target smooth pacing interval, and when a difference therebetween is greater than a preset threshold, the pacing control module controls the atrial pacing module to deliver the atrial pacing pulses once in the target smooth pacing interval, and then restores the preset pacing interval, and controls the atrial pacing module to transmit the atrial pacing pulses according to the preset pacing interval, in order to prevent a sudden decrease in the atrial rate as an original high autonomous heart rate is temporarily suppressed after the completion of firing the smooth transition pacing sequence.

The above embodiments describe in detail the technical solution and beneficial effects of the present invention. It should be understood that the above embodiments are only the most preferred embodiments of the present invention and are not used to limit the present invention. Any modification, supplement and equivalent replacement made within the scope of the principle of the present invention shall be included within the protection scope of the present invention.

The invention claimed is:

1. A pacing device for preventing occurrence of atrial fibrillation following premature atrial contraction, comprising: an atrial sensor, an atrial pacemaker, a clock/timer, a pacing controller, a data statistics processor, and a storage medium, the atrial sensor being configured to sense atrial signals, the atrial pacemaker being configured to deliver atrial pacing pulses, the clock/timer being configured to calculate and control firing timing of the atrial pacing pulses when atrial pacing events occur and acquire atrial intervals from the sensed atrial signals, wherein the storage medium is configured to store the atrial events and the atrial intervals identified by the pacing controller, and an average atrial interval identified by the data statistics processor according to time, wherein the atrial events comprise the atrial pacing events, atrial sensing events, and premature atrial contraction events; the storage medium is further configured to store an atrial safe pacing interval;

the atrial sensor senses and transmits the atrial signals to the pacing controller; the pacing controller sets a pacing interval based on a preset lower pacing interval (LRI), and an atrial refractory period shorter than a normal sinus atrial interval or the pacing interval, initiates the pacing interval and the atrial refractory period both after the atrial sensor senses the atrial signals and the atrial pacemaker delivers the atrial pacing pulses, and transmits them to the clock/timer;

the clock/timer performs timing according to the pacing interval, when the timing for the pacing interval is complete and the atrial sensing events do not appear during the pacing interval, the pacing controller controls the atrial pacemaker to deliver the atrial pacing pulses, resets the pacing interval and the atrial refractory period, transmits the pacing interval and the atrial refractory period to the clock/timer, and identifies, at the same time, the atrial pacing pulses as the atrial pacing events and records the atrial pacing events in the storage medium; when an atrial event outside the atrial refractory period is sensed during the pacing interval, the timing for the pacing interval is terminated, the pacing interval and the atrial refractory period are reset, and the atrial event outside the atrial refractory period during the pacing interval is identified, at the same time, as an atrial sensed event and recorded in the storage medium; when an atrial event during the atrial refractory period is sensed during the pacing interval, the timing for the pacing interval is terminated, and the atrial event sensed during the atrial refractory period is identified, at the same time, as the premature atrial contraction event;

after the atrial sensing events and the atrial pacing events, the pacing controller obtains an event interval between the atrial event and a previous atrial event according to the timing data of the clock/timer, wherein the event interval is the atrial interval;

the pacing controller transmits the atrial interval to the storage medium and the data statistics processor;

the data statistics processor is configured to calculate the average atrial interval according to the atrial intervals, wherein the data statistics processor calculates an average value based on the current atrial interval and a plurality of recent atrial intervals extracted from the storage medium to obtain the latest average atrial interval and transmit the latest average atrial interval to the storage medium for storage;

the pacing controller is configured to extract M recent consecutive atrial events containing a current premature atrial contraction event from the storage medium when a current atrial event is identified as the premature atrial contraction event, and the pacing controller is configured to enter into a pacing control process to prevent the occurrence of atrial fibrillation following the premature atrial contraction when N premature atrial contraction events are present in the M recent consecutive atrial events, wherein the value range of N is [1, M]; and the pacing control process comprises: acquiring the current atrial interval, the atrial safe pacing interval and the latest average atrial interval corresponding to the current premature atrial contraction event from the storage medium; comparing the current atrial interval with the atrial safe pacing interval; when the current atrial interval is less than the atrial safe pacing interval, taking the atrial safe pacing interval as an initial smooth pacing interval, taking the latest average atrial interval as a target smooth pacing interval, and constructing a first smooth transition pacing sequence; when the current atrial interval is greater than or equal to the atrial safe pacing interval, taking the current atrial interval as the initial smooth pacing interval, taking the latest average atrial interval as the target smooth pacing interval, and constructing a second smooth transition pacing sequence; and then controlling the atrial pacemaker to transmit the atrial pacing pulses according to the first smooth transition pacing sequence or the second smooth transition pacing sequence to achieve smooth transition pacing;

wherein the first smooth transition pacing sequence and the second smooth transition pacing sequence are constructed according to following formula:

$$\mathrm{ASPI\_}[k+1] = (\mathrm{ASPI\_}[k] + \mathrm{ASPI\_Target})/2$$

wherein ASPI_Target represents the target smooth pacing interval of which a value is taken as the latest average atrial interval; when k=1, 2, 3, . . . , or K−2, ASPI_k represents a $K^{th}$ smooth transition pacing interval obtained by calculation by the pacing controller; when k=0, ASPI_[0] represents the initial smooth pacing interval; when the atrial interval is less than the atrial safe pacing interval, a value of ASPI_[0] is taken as the atrial safe pacing interval, and the atrial safe pacing interval and K−1 smooth transition pacing intervals form the first smooth transition pacing sequence with a dimension of K; and when the atrial interval is greater than or equal to the atrial safe pacing interval, a value of ASPI_[0] is taken as the current atrial interval, and the current atrial interval and the K−1 smooth transition pacing intervals form the second smooth transition pacing sequence with a dimension of K;

wherein the atrial safe pacing interval is determined by the pacing controller according to the step of:

taking a sum of a steady-state atrial cell action potential duration and an atrial safe diastolic interval as the atrial safe pacing interval, and the steady-state atrial cell action potential duration being 200 ms to 300 ms, and the atrial safe diastolic interval being 50 ms to 150 ms.

2. The pacing device for preventing occurrence of atrial fibrillation following premature atrial contraction according to claim 1, wherein after the pacing controller controls the atrial pacemaker to deliver the atrial pacing pulses according to the smooth transition pacing sequence, the pacing controller restores a preset pacing interval, and controls the atrial pacemaker to transmit the atrial pacing pulses according to the preset pacing interval.

3. The pacing device for preventing occurrence of atrial fibrillation following premature atrial contraction according to claim 1, wherein after the pacing controller controls the atrial pacemaker to deliver the atrial pacing pulses according to the smooth transition pacing sequence, the pacing controller compares a preset pacing interval with the target smooth pacing interval, and when a difference therebetween is greater than a preset threshold, the pacing controller controls the atrial pacemaker to deliver the atrial pacing pulses once in the target smooth pacing interval, and then restores the preset pacing interval.

* * * * *